United States Patent
Kayano et al.

[11] Patent Number: 5,812,747
[45] Date of Patent: Sep. 22, 1998

[54] COPYING SYSTEM

[75] Inventors: Shizuo Kayano; Yoshio Yamazaki, both of Hachioji, Japan

[73] Assignee: Konica Corporation, Japan

[21] Appl. No.: 682,932

[22] Filed: Jul. 8, 1996

[30] Foreign Application Priority Data

Jul. 11, 1995 [JP] Japan .................................. 7-174879

[51] Int. Cl.$^6$ .............................................. G06K 15/00
[52] U.S. Cl. ....................................... 395/114; 395/112
[58] Field of Search .................................. 395/101, 112, 395/113, 114, 309, 828, 834, 835, 836, 837; 399/85, 87, 77, 18, 19; 400/3, 61, 62, 67, 70, 71

[56] References Cited

U.S. PATENT DOCUMENTS

| | | | |
|---|---|---|---|
| 4,170,791 | 10/1979 | Daughton | 395/309 |
| 4,623,244 | 11/1986 | Andrews et al. | 355/24 |

*Primary Examiner*—Arthur G. Evans
*Attorney, Agent, or Firm*—Jordan B. Bierman; Bierman, Muserlian and Lucas

[57] ABSTRACT

A copying system includes a plurality of copying apparatus each capable of sharing image formation with other copying apparatus. The plurality of copying apparatus each having: reading device for reading an original document to obtain an image data thereof; memory device for storing the image data; image forming device for forming an image, based on the image data stored in the memory device; control device for determining allotment conditions for the image formation with other copying apparatus when an inter-connected mode in which the plurality of copying apparatus are connected and operated with each other is selected; sending device for sending the image data stored in the memory device to other copying apparatus; receiving device for receiving an image data sent from other copying apparatus. The image data received is stored in the memory means. When the inter-connected mode is selected, each of the other copying apparatus forms images on the basis of the image data received according to the determined allotment conditions. When one of the plurality of copying apparatus in the inter-connected mode during image forming operation becomes unable to form images, the control means determines new allotment conditions for the image formation with the other operable copying apparatus to form image which have not been formed among images allotted to the one of the copying apparatus.

13 Claims, 12 Drawing Sheets

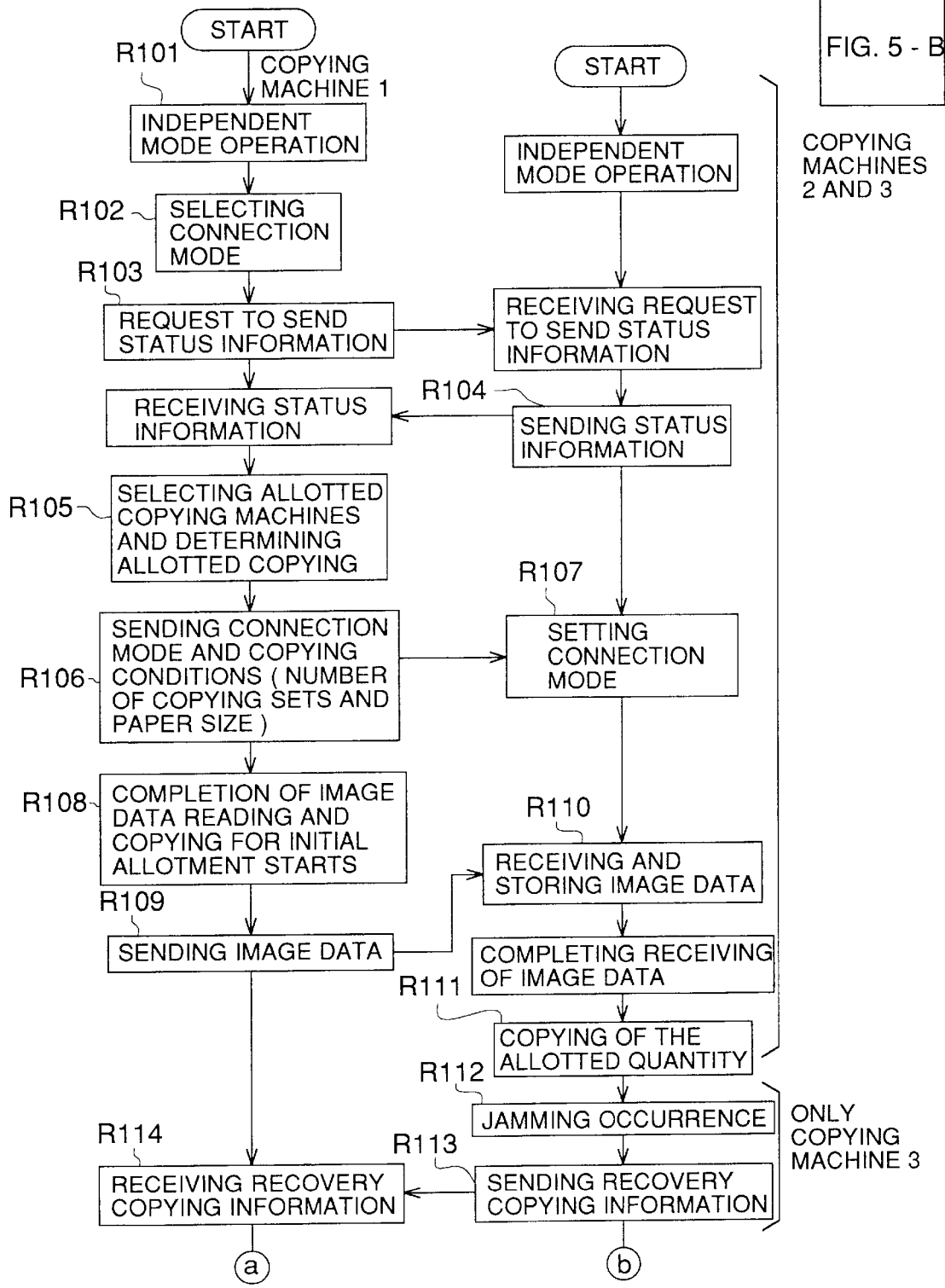
FIG. 5 - A

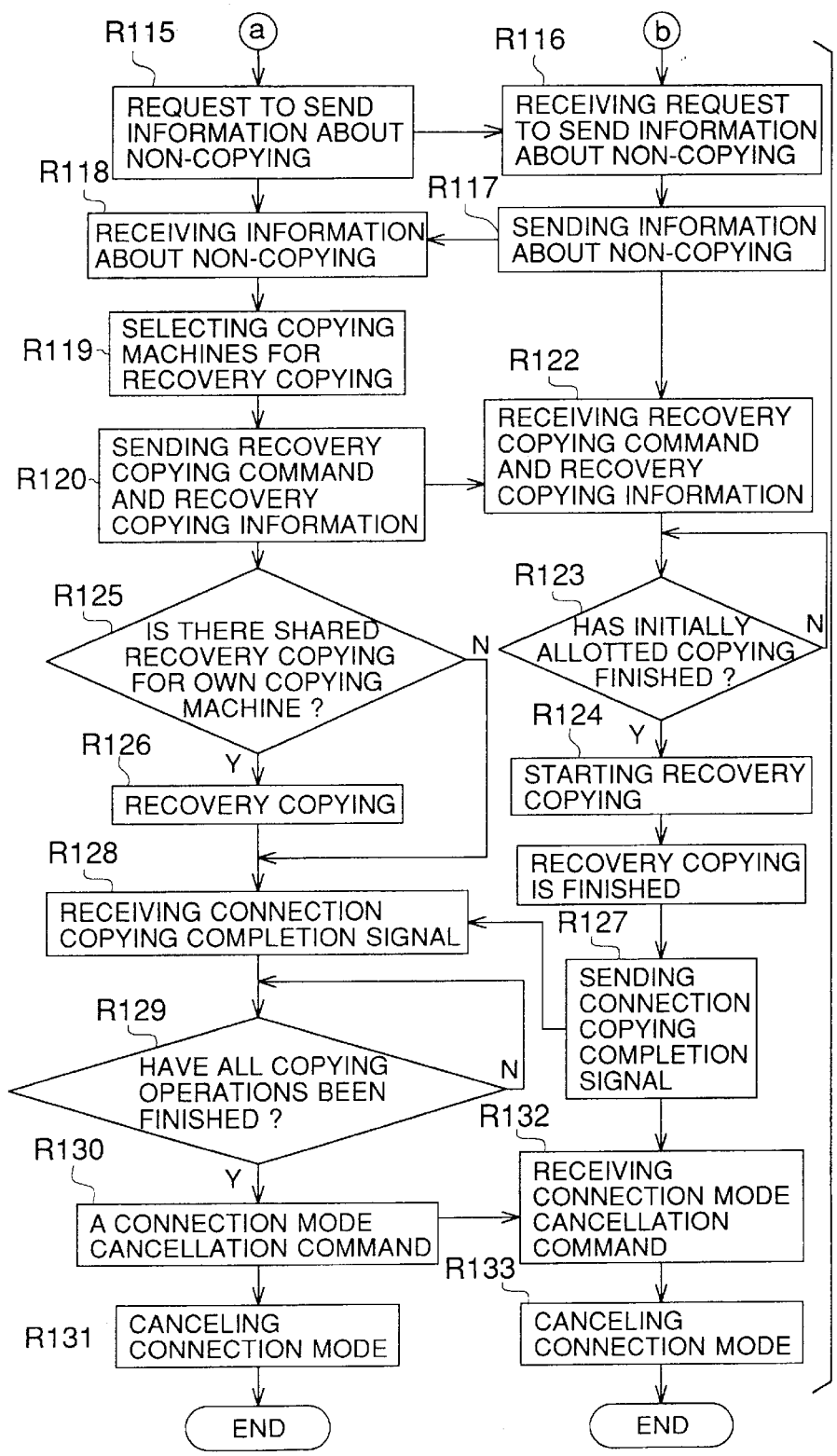

COPYING SYSTEM

BACKGROUND OF THE INVENTION

The present invention relates to a copying system having plural units of copying machines. The present invention relates to allowing other copying machine(s) to form images which have not been image-formed among the outputted images assigned initially to a copying machine which was not able to form said image (this is referred to as "recovery copying").

Japanese Patent Publication Open to Public Inspection No. 66960/1983 discloses a technology, when one recording unit in a single copying machine having plural recording units in one unit can not form images, to allow another recording unit to conduct recording which should have been recorded by the initial image-forming-impossible recording unit.

However, when one recording unit becomes impossible to record images, the above-mentioned technology only has the function to allow another predetermined recording unit, to output the images which was allotted initially to the initial recording unit which became impossible to form said image. Therefore, since copying set and sheets number and specifications of the recording unit to record were not taken into consideration, there were shortcomings that rapid and effective image formation could not be expected when there were many originals to be copied or many copying set numbers and that it was not easy to operate.

SUMMARY OF THE INVENTION

Apart from the conventional technology wherein image formation for non-image formed portion of the image outputting allotted to a recording unit which became impossible to form images is simply allotted to another recording unit in one recording apparatus, an object of the present invention is to structure a copying system wherein arbitrary plural copying machines are mutually connected so that, when one copying machine becomes impossible to form images due to jamming or no paper in a tray, information for recovering copying and specifications of the copying machine are mutually communicated, one or plural copying machine which will conduct recovery copying is determined and thereby improvement in overall effectiveness due to shortened of recovery copying time and customer's convenience are realized. The present invention enables allotment of recovery copying to plural copying machine and thereby shortening the time necessary to conduct recovery copying; to facilitate obtaining a completed set of copied material by including already outputted images prepared by the non-functional copying machine and the remaining output images formed by other copying machine in charge of recovery copying; to enable finishing of copying operation earlier totally by selecting, when commanding recovery copying, copying machine which will finish copying in the shortest time among the copying machines connected to each other for operation or idle selecting copying machine wherein the initially allotted copying is finished; and for copying machine to enable to conduct recovery copying smoothly by sending them image data while the copying machines which are allotted recovery copying is operating, i.e., before they finish copying the initial allotment so that these copying machines will complete the initial allotment and recovery copying allotment without interruption.

An embodiment for attaining the above-mentioned object is as follows.

A copying system having the following constitution:
  plural copying machines;
  each copying machine has the following constitution;
    a reading means which reads an original and obtains image data;
    a memory means which stores image data;
    an image-forming means which forms images based on image data stored in aforesaid memory means;
    a mode selecting means for selecting a connection mode for communicating with other copying machine and to conduct image forming;
    a control means which determines allotment conditions for forming images by allotting other copying machine when the connection mode;
    an image data sending means which send image data stored in aforesaid memory means to other copying machine;
    an image data receiving means which receives image data from other copying machine wherein the received image data is stored in aforesaid memory means,
    wherein when the connection mode is selected, aforesaid other copying machine forms images based on the received image data, in accordance with allotment conditions determined as above.

Here, when any one of plural copying machines connected to each other becomes impossible to form images during image formation operation, the above-mentioned control means determines conditions wherein other copying machine, capable of forming images, are allotted to form images, which have not been formed, among images allotted to the non-functional copying machine.

BRIEF DESCRIPTION OF THE DRAWINGS

FIG. 5-A is a flow chart of the first half of the present copying system for explaining operation allotment in each copying machine and changes of operation status.

FIG. 5-B is a flow chart of the second half of the present copying system for explaining operation allotment in each copying machine and changes of operation status.

DETAILED DESCRIPTION OF THE PREFERRED EMBODIMENT (Example)

Examples of the present invention will be explained in detail referring to FIGS. 1 through 11.

Figure 1:
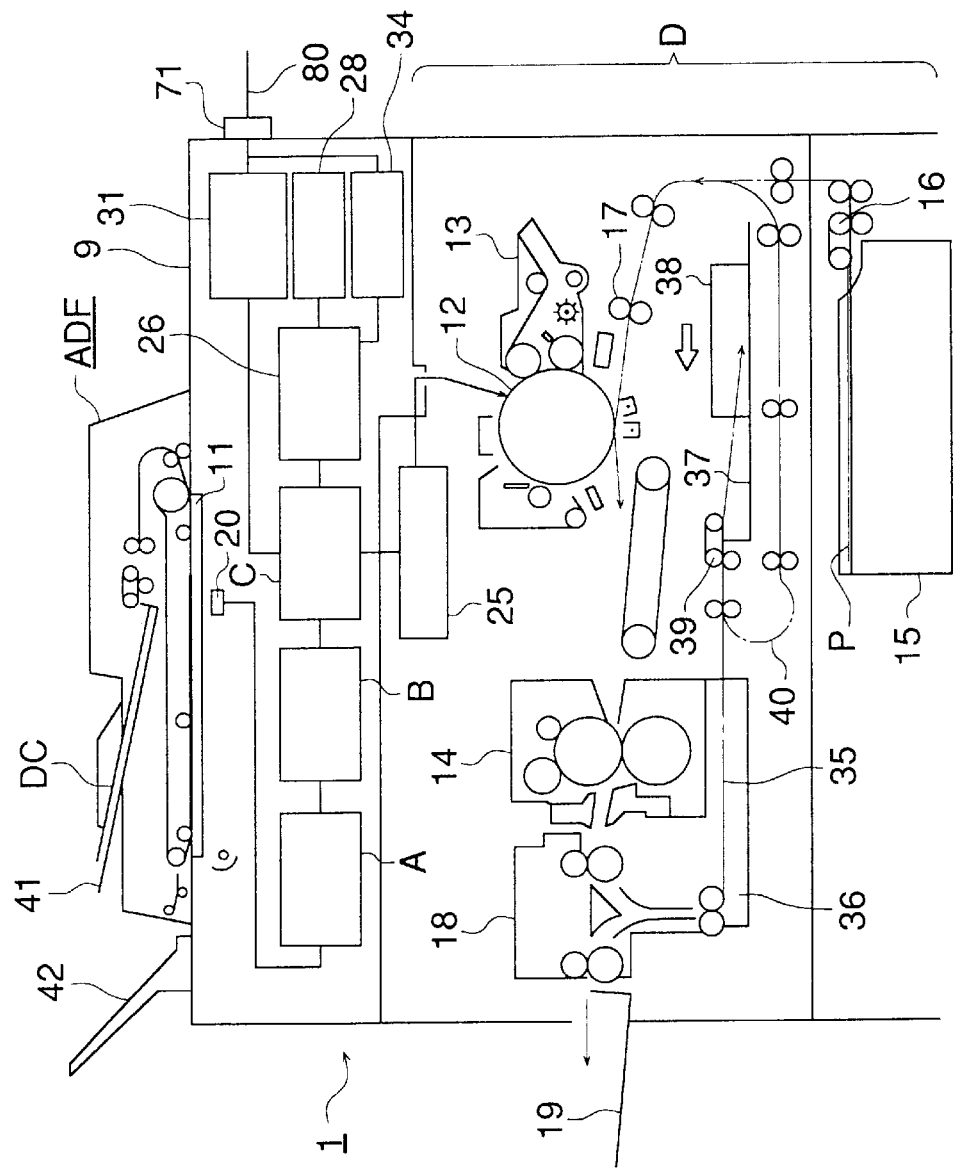
FIG. 1 is a schematic diagram of a digital copying machine.

FIG. 1 is a schematic diagram showing a black-and-white digital copying machine, as an example of a copying machine capable of structuring the copying system in the present examples.

In FIG. 1, copying machine 1 comprises copying machine main body 9 which reads image data on original DC, stores aforesaid image data and forms images on a recording paper based on aforesaid image data, and automatic document feeder ADF which automatically and successively feeds original DC onto platen glass 11 on an original table.

Original DC fed to a prescribed position on a platen glass by means of automatic document feeder ADF is read by image sensor 20, converted to image signals in image signal reading unit A, converted to image data suitable for image forming by means of image data processing unit B and stored in image memory unit C. Further, image data outputted from the image data processing unit is image-formed on recording paper P by means of an electrophotography type image forming apparatus equipped with laser writing unit 25 in image forming unit D. The image forming unit D can form images on recording paper P based on image data stored in image memory unit C.

Control unit 26, equipped with operation unit 28, sets copying conditions, displays copying conditions and changes operation modes, and together with these, controls a copying machine based on status information related to the status inside the copying machine, determines a copying machine suitable for inter-connected copying based on the status information received by status information sending and receiving unit 34 and control to send image data using image data sending and receiving unit 31 to a copying machine judged to be suitable for connection copying. Image data sending and receiving unit 31 and status information sending and receiving unit 34 are connected to transmission line 80 through connector 71 so that they send and receive status information and image data with other copying machines which are connected to the transmission line 80.

Figure 2:
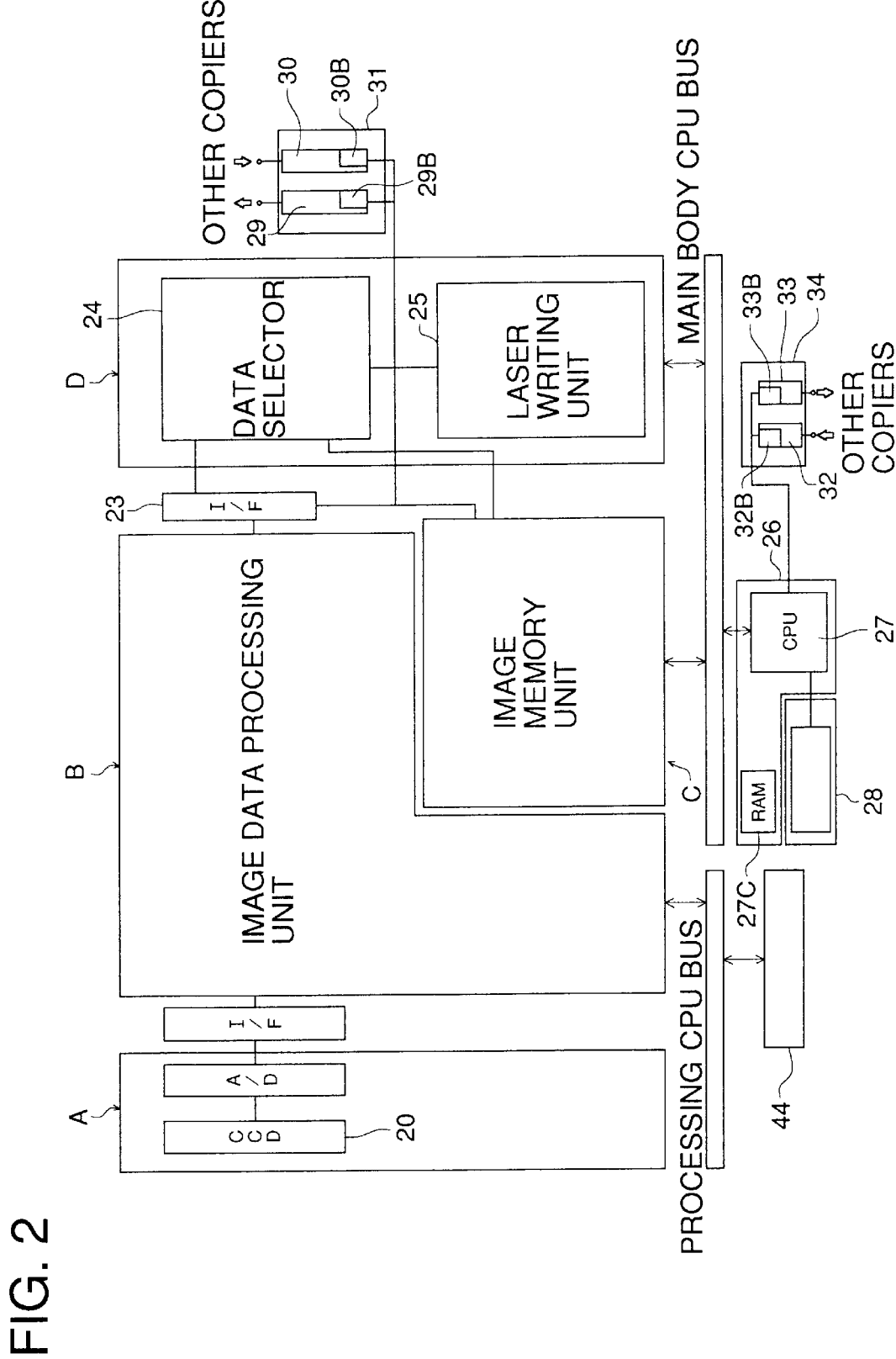
FIG. 2 is a block diagram of a digital copying machine.

FIG. 2 is a block diagram of a digital copying machine.

Next, referring to the block diagram in FIG. 2, the circuit structure of the black-and-white digital copying machine composed of the image signal reading unit A, image data processing unit B, image memory unit C, image forming unit D, control unit 26, image data sending and receiving unit 31 and status information sending and receiving unit 34 will be explained.

In image signal reading unit A, analog image signals outputted from image sensor 20 are converted to digital image signals, i.e., image data, by means of an A/D converter, and then, outputted to image data processing unit through interface I/F.

The digital image signals inputted in image data processing unit B is converted to density information in a density conversion unit (not illustrated). The density information is subjected to magnification and reduction processing as necessary, and also subjected to gradation correction processing corresponding to the characteristics of image forming unit D. Following this, it is outputted to image memory unit C and image forming unit D through interface 23.

Image memory unit C stores inputted image data for plural pages in such a manner that it can be re-written. Therefore, image memory unit C has an address register, a data buffer, an image data writing and reading means containing a latch for maintaining read and written signals and a memory which stores compressed image data on the basis of page units. A data compression and extension device for compressing image data in order to accumulate much image data in limited memory capacity and in order to write such image data in the memory and in order also to expand compressed image data read from the memory.

Image forming unit D is compatible with a mode which conducts image forming on a recording paper immediately after corresponding to the reading of the original and a mode which conducts image forming after reading image data, in an arbitrary order, stored in image memory unit C on a page basis. In order to actuate at least the above-mentioned two modes, data selector 24 for switching image data from image memory unit C and image data for ordinarily forming the image immediately. The above-mentioned data selector 24 selects either the image data read from image memory unit C or the image data successively outputted from image data processing unit B in accordance with reading, and then, subsequently outputs it to laser writing unit 25. In addition, image forming unit D is compatible with a mode which conducts image forming by the use of image data obtained from an image reading unit of the same copying machine and also is compatible with a mode which conducts image forming based on image data sent from another copying machine.

Control unit 26 has CPU 27 which conducts each control based on the program and RAM 27C which temporarily stores data for operation. Control unit 26 designates an operation mode as a copying machine based on designation for inputting from operation unit 28 or controls copying conditions.

Control unit 26 sets operation conditions such as selection of an operation mode as an independent copying machine, designation for inputting size of a recording paper and copying quantity and selection of the inter-connected copying mode which connects plural copying machines for operation, based on designation for inputting from operation unit 28, using an operation panel and a key switch. In addition, the control unit conducts, in addition to control of electrophotographic process for image forming as an ordinary copying machine and control of feeding recording papers, control of each step in the case of inter-connected copying, namely, receiving and sending status information, control of the image data sending and receiving unit for sending and receiving image data and the status information sending and receiving unit and judgment of copying machine based on status information. The above-mentioned control unit 26 grasps the conditions of the copying machines by the use of various sensors in order to control the next process while monitoring whether the operation of the copying machine is defective and also in order to conduct self-diagnosis for grasping exact status when a malfunction occurs. For example, temperature inside fixing device 14, the existence of toner inside developing device, paper size of contained paper quantity in cassette 15 being used, current copying quantity and unnecessary remain of paper in a paper feeding and conveyance path are cited. These status are stored by interrupting the CPU for every prescribed time or, when there occurred a status change, stored in a temporary memory device such as a register and a buffer in the form of data or flag. After these status data are stored independently or as combination data, they are displayed as message such as "heater warm-up is completed" or "copying machine is ready (during a stand-by position)" by the use of lighting of the LED or lamps on the operation panel. When there are many flags, they are stored in a flag table or a flag data area which are provided on RAM27C. A part of the above-mentioned data or flagged information is sent to outside when conducting inter-connected copying as status information inside the copying machine.

Image data sending and receiving unit 31 contains image data sending unit 29, image data sending buffer 29B, image data receiving unit 30, image data receiving buffer 30B and an interface board (not illustrated), and sends image data read from the memory to outside copying machines or receives the image data from the other copying machine. Status data sending and receiving unit 34 contains status data receiving unit 32, status data receiving buffer 32B, status data sending unit 33, status data sending buffer 33B and an interface board (not illustrated), and is so structured to send status data read regarding image formation by each copying machine or receives the status data from the other copying machine.

The above-mentioned image data sending and receiving unit 31 is controlled by the use of a program for controlling communication. CPU 27 may send image data stored in image memory unit C to sending buffer 29B in sending unit 29 and send sending starting signal. Communication procedures such as connection start, connection confirmation, sending and connection finish advances automatically so that data can be received successively by receiving buffer 30B in receiving unit 30 of the receiver copying machine.

In the same manner as above, the above-mentioned status data sending and receiving unit 34 is controlled by the use of a program for controlling communication. CPU 27 may send status information stored in the flagged data area to sending buffer 33B in sending unit 33 and send sending starting signal. Communication procedures such as connection start, connection confirmation, sending and connection finish advance automatically so that data can be received successively by receiving buffer 32B in receiving unit 32.

Figure 3:
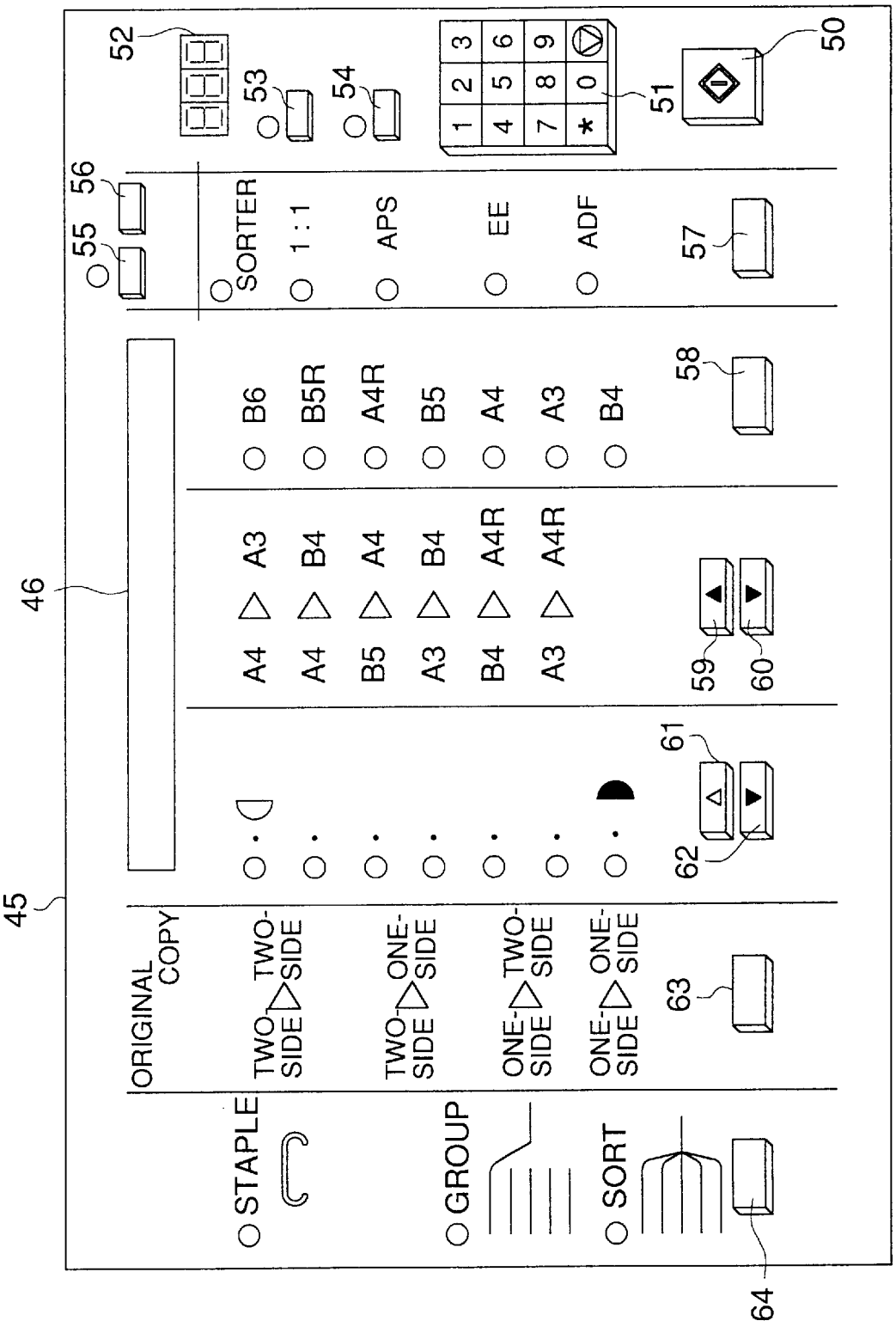
FIG. 3 is an explanatory drawing of an operation panel.

FIG. 3 is an explanatory drawing showing operation panel 45 in operation unit 28.

By pressing the copy button, copying operation starts. Ten-key 51 is used for inputting copying set number. The copying set number set in advance by this ten-key and the copying quantity currently operated are displayed on displaying unit 52. Interruption button 54 is used to interrupt continuous copying operation in order to allow other one or two sheets urgently.

A mode which connects plural copying machines and operates them is referred to as "inter-connected mode". When selecting the inter-connected mode, press connection mode selection button 55, by which the inter-connected mode is designated and selected. The LED above said button is lit, showing that the copying machines are operating under the inter-connected mode. If the inter-connected mode canceling button 56 is pressed, aforesaid mode is canceled and the LED indicating that the inter-connected mode is selected is extinguished. Incidentally, while the inter-connected mode is selected, various messages regarding orders and reference and necessary display such as inputting instruction about recovery copying are displayed on a dot matrix liquid crystal display panel 46.

With regard to ordinary functions as a copying machine, conditions can be manually designated by pressing the prescribed buttons such as paper size selection button 58, enlargement button 59, reduction button 60, copy density (lighter) button 61, copy density (darker) button 62, copy mode selection button 63 and sorter mode selection button 64.

Copy mode selection button 63 designates a copying mode, such as a "one-side to one-side mode" which reads one side of the original document and forms images on one side of the recording paper or "two-side to two-side mode" which reads both sides of the original document and forms images on both sides of the recording paper. By means of this copy mode selection button 63, writing image data into the memory, change or non-change of reading sequence of the image data stored in the memory, automatic switching for reversal paper-dischargeing switching unit and use or non-use of an intermediate tray are automatically set.

Figure 4:
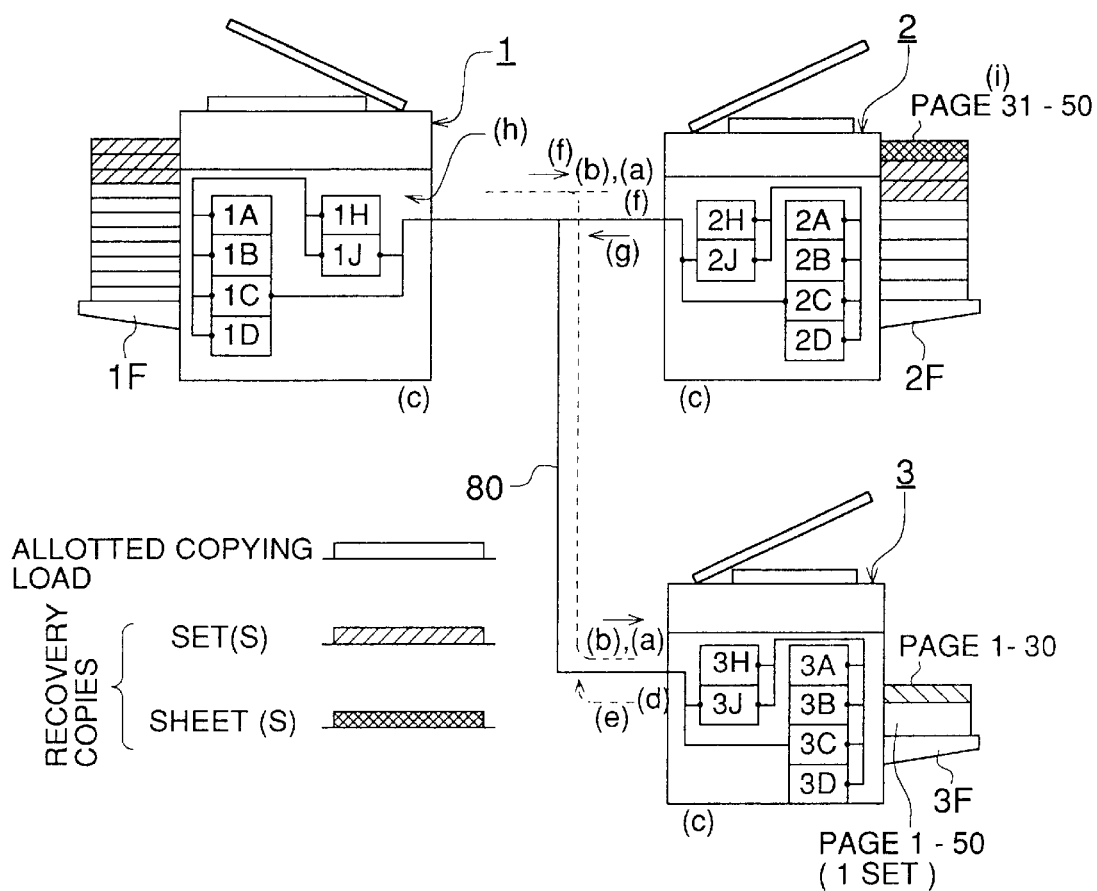
FIG. 4 is an explanatory drawing for explaining of operation of each operation step of initially-allotted copying, error occurrence and recovery copying after the occurrence of error in the present copying system wherein all copying machines are inter-connected and operable.

FIG. 4 is an explanation drawing showing each step of allotted copying, error occurrence and subsequently recovery copying in the example of the present copying system wherein plural copying machines capable of forming images are inter-connected so that copying was allotted to each copying machine.

Here, "allotted copying" means that plural units of copying machines are allotted to form images from image data obtained by reading a set of originals. "Error occurrence" means that image formation cannot be continued due to a malfunction in the copying machine, for example, paper jamming, paper depletion or toner depletion.

In FIG. 4, one copying system is structured as a whole wherein copying machines 1 through 3 are inter-connected through transmission line 80 so that status information and image data are sent and received between each copying machine, as necessary.

Copying machines 1, 2 and 3 are respectively equipped with reading means 1A, 2A and 3A which read an original and obtain image data and are also equipped with memory means 1B, 2B and 3B which store aforesaid image data so that they send aforesaid image data stored in the above-mentioned memory means with other copying machine. In addition, the above-mentioned copying machines 1, 2 and 3 are respectively equipped with image data sending and receiving means 1C, 2C and 3C which receive image data from other copying machine, status information sending and receiving means 1J, 2J and 3J which receive status information which is information about the status regarding forming of images sent from other copying machine and send status information of its own copying machine to other copying machine and evaluation means 1H, 2H and 3H which evaluate (hereinafter, referred also to as "select") whether other copying machine are suitable for copying based on the status information received by status information receiving means in the above-mentioned status information sending and receiving means. Concurrently with the above, image forming unit 1D, 2D and 3D of each copying machine form images based on image data received by the above-mentioned reading means, image data read from the above-mentioned memory means or image data received from other copying machine. The recorded papers wherein images are formed are separated one set by one by means of shift tray sorters 1F, 2F and 3F which separate recorded papers for each set wherein each recorded papers are stacked into its proper position for each set when being discharged.

FIGS. 5-A and 5-B are flow charts showing operation allotment of each copying machine in the present copying system, changes of operation status and relationships of sending and receiving each signal. FIG. 5-A shows the first half thereof, and FIG. 5-B shows the second half thereof.

Figure 6:
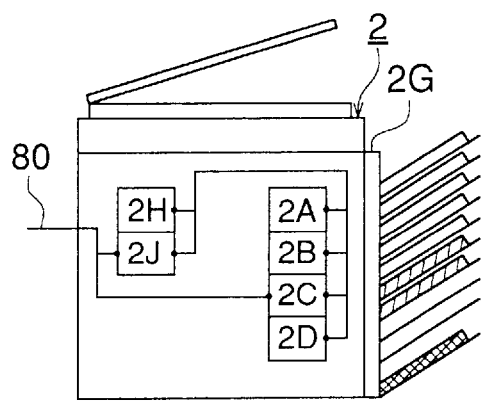
FIG. 6 is a schematic drawing showing a variety example of a paper-discharging unit which discharges outputted images in the present invention.

FIG. 6 is another example of that shown in FIG. 4, wherein a multi-bin type sorter 2G which let multiple bin house one recorded paper respectively for separating in place that copying machine 2 in the present copying system uses shift tray sorter 2F.

Referring to FIG. 5-A and FIG. 5-B, an outline of the present copying system in the inter-connected mode and an outline of countermeasures when malfunctions (such as paper jamming) occur in any one unit of a slave copying machine including operation of the master copying machine and the slave copying machine respectively and sending and receiving signals between each copying machine will be explained. Here, "master copying machine" refers to a copying machine which sends image data read by the reading means and image data read from the memory means. "The slave copying machine" refers to a copying machine which receives image data sent from other copying machine and subsequently conducts copying operations.

To copying machine 1, copying machine 2 and copying machine 3 which are allotted to be able to form images, a power supply can be energized respectively. The above-mentioned copying machines can also operate as independent copying machines (step R101).

An operator places an original onto reading means 1A of copying machine 1, presses connection mode selection button 55 on operation panel in operation unit 28 for selecting the connection mode (step R102), set copying conditions such as copying quantity, original size and copy mode, for example, such as the "two-side to two-side mode" wherein images are recorded on both sides of a recording paper from an original having data on both sides and finally presses copy button 50.

Due to the above-mentioned procedure, copying is initiated. The original image data read in image signal reading unit 1A is stored in image recording unit 1C and copying machine 1 operates as the master copying machine. On the left side of FIGS. 5-A and 5-B, operation sequence of copying machine 1 as the master copying machine, and on the right side, operation sequence of copying machines 2 and 3 during operation for each step of the slave copying machine.

When the inter-connected mode is selected, copying machine 1 (the master copying machine) requests other copying machines 2 and 3 (slave copying machines) to which copying machine 1 is inter-connected to send "status information sending request" command (step R103) which request them to send status information indicating the specifications of the copying machines and function status. The copying machines 2 and 3 then send copying machine 1 the status information (step R104) by the use of status information sending and receiving means 2J and 3J which were prepared in advance on a table. Copying machine 1 receives it by means of status information sending and receiving means 1J, and then, based on copying conditions set by the above-mentioned operator, the status information of the other copying machine which sent the status information and status information of its own information, copying machine 1 determines which machine, including itself, will be suitable for allotted copying in the copying system and which machine can provide effective allotted copying and set operation quantity of allotment (step R105). In the above-mentioned procedure, the operation quantity is allotted to functional copying machines in the system and which are suitable for copying in accordance with copying speed in such a manner that copying finishes in the shortest time. (Practically, the master copying machine sets the number of set to each slave copying machine in proportion to their copying speed so that their copying operations finishes almost at the same time)

Next, copying machine 1 (the master copying machine) sends the selected copying machines (hereinafter, it is considered that copying machines 2 and 3 are selected) a connection mode signal and copying conditions (allotted quantity and paper size) (step R106) for instructing the inter-connected mode. The other copying machines which received the connection mode signal, change mode from an independent mode to the inter-connected mode (step R107), and then, they display the connection mode on the operation panel and set the pressing button on the operation panel to "invalid".

Due to the above-mentioned procedure, other operators cannot conduct copying using the copying machine during slave operation (copying machines 2 and 3). Copying machines 2 and 3 are in a stand-by status awaiting receiving image data.

After copying machine 1 finishes reading the original and also finishes storing image data in image memory means 1B, copying machine 1 sends the image data to copying machines 2 and 3 by means of image data sending and receiving means 1C. Here, the image data is sent (step R109) after finishing reading the image data (step R108). However, it is allowed that the image data may be sent every time the image data is read on a page by page basis and finishing storing. In addition, in a case when the master copying machine allots recovery copying to the master copying machine itself, copying machine 1 conducts copying as allotted. Copying machines 2 and 3 receive the image data by means of image data sending and receiving means 2C and 3C, and then, store the image data in image memory means 2B and 3B (step R110). When copying machines 2 and 3 finish receiving the image data, they start copying for allotted quantity (step R111). In this occasion, since the image data is sent on a page basis, copying machines 2 and 3 may start copying after waiting for receiving all data, or they may form images every time storing the image data sent on a single page basis finishes.

Here, suppose that jamming occurs during the allotted copying operation in copying machines 3 (the slave copying machine). Copying machine 3 sends copying machine 1 (the master copying machine) information that it became impossible to form images by means of status information sending and receiving means 3J (step R113). Copying machine 1 requests copying machine 2 to send information about unfinished copying (step R115) as information for determining allotting copying initially allotted to copying machine 3 to other available copying machines for recovery copying.

The information about unfinished copying is information containing copying quantity in which copying has not been finished (including number of set and number of page during one set) or required time until all copying is finished.

Copying machine 2 receives the above-mentioned request to send information about unfinished copying (step R116), and then, sends copying machine 1 aforesaid information about unfinished copying at the time of receiving aforesaid request (step R117). Copying machine 1, as described later in detail, selects recovery information from copying machine 3, information about unfinished copying of itself (copying machine 1) and copying machine which conduct recovery copying in accordance with the information about unfinished copying from copying machine 2 (step R119), and then, sends a recovery copying conducting command to the selected recovery copying conducting copying machine (step R120). Concurrently, if recovery copying processing is conducted by itself, copying machine 1 starts recovery copying (step R126). As described later in detail, when copying machine 1 has already finished copying its initially allotted quantity, it immediately start recovery copying (step R126). When it has not finished copying the initially allotted quantity yet, copying quantity for recovery copying is added to the initially allotted copying quantity. Due to the above-mentioned procedure, copying for the initial allotment to recovery copying can be advanced continuously. In addition, when jamming occurs during copying a set of documents, in order to easily combine portions in which image forming has already been finished and portions in which images has not been formed yet and subjected to recovery copying, the remaining portions are copied lastly or discharged separately after being copied. This situation will be explained separately in another flow chart.

In the same manner as in copying machine 1, when copying machine 2 receives recovery information, copying machine 2 checks whether copying of its initial allotment has been finished (step R123). If the copying has been finished, it starts image forming for the recovery copying (step R124). If the copying has not been finished, it adds quantity for recovery copying to its initial allotment, and then, forms all images. When copying machine 2 has finished all copying including the initial allotment and the recovery copying after that, it sends an inter-connected copying completion signal to copying machine 1 (step R127). Copying machine 1 (the master copying machine) receives the connection copying completion signal (step R128). When all slave copying machines and itself have finished copying (step R129), copying machine 1 sends an inter-connection mode cancellation command (step R130) to all slave copying machines in which connection operation was conducted, and following it, it cancels all-inter-connection mode of itself (step R131).

Due to receiving of the above-mentioned connection mode cancellation command (step R132), the slave copying machines cancel the inter-connection mode (step R133), extinguish display of the connection mode, validate input-ting to the operation button and become operable in an independent mode.

Individual control operations for conducting the above-mentioned controls will now be explained referring to sub-routines shown in FIGS. 7 through 10.

Figure 7:
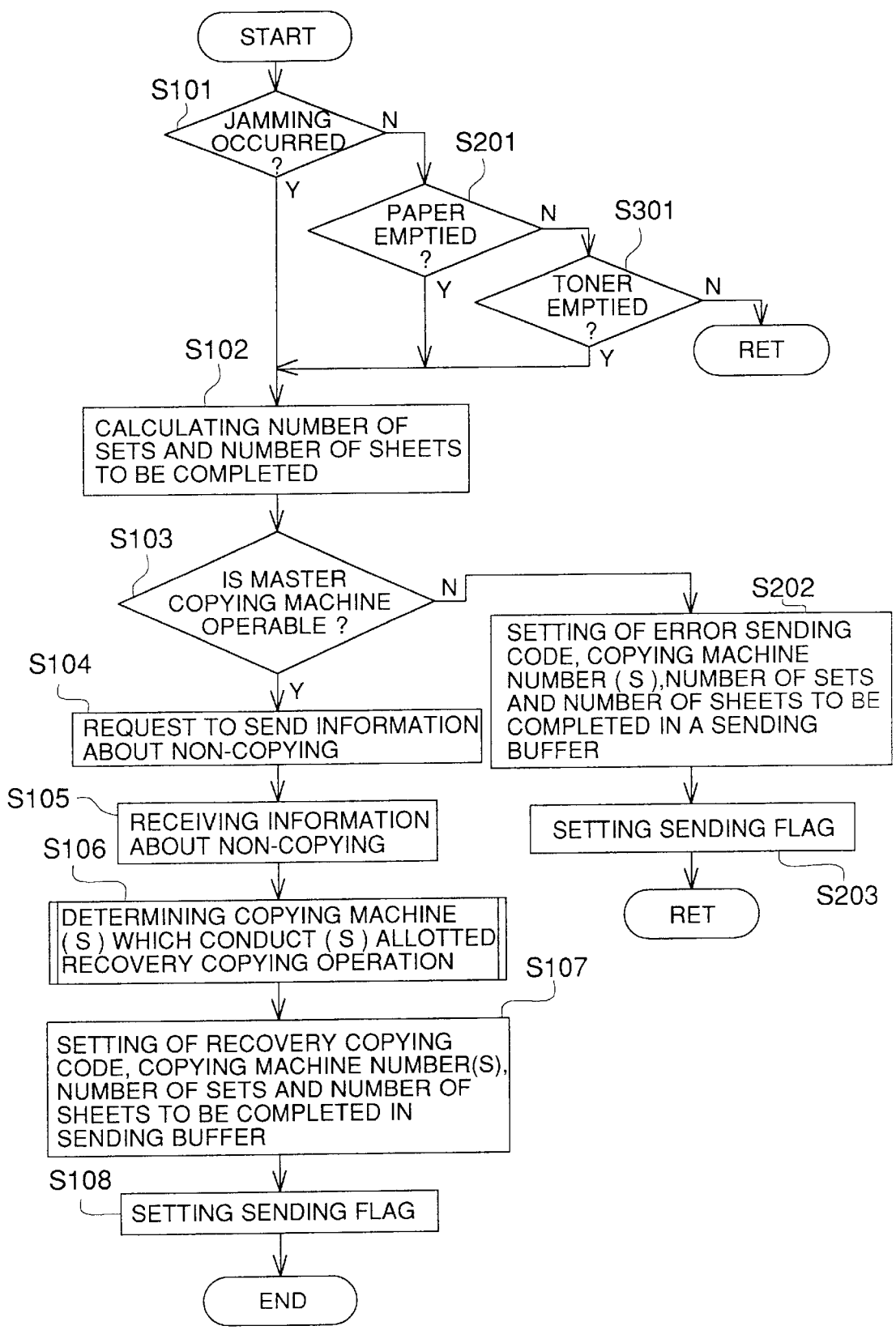
FIG. 7 is a flow diagram showing a sub-routine from sending of recovery information to sending of recovery copying command when a copying machine becomes non-functional.

FIG. 7 is a sub-routine showing processing of a copying machine when it becomes impossible to form image due to the occurrence of malfunction such as jamming during inter-connected operation. Errors may occur in either the master copying machine or slave copying machines. The present sub-routine relates to the slave copying machines and corresponds to step R112 and R113 in FIG. 5-A. The present sub-routine is called from the main routine.

In the present copying system, when an error such as paper jamming occurs in one copying machine which is during inter-connected operation, CPU 27 in control unit 26 in the copying machine wherein the error occurred enters into a sub-routine for checking the cause of the image forming inability and processing when outputting is impossible.

In the present copying system, malfunctions sensed by each sensor, not illustrated, inside each copying machine are stored in a flag table inside RAM27C in the control unit.

CPU27 in the copying machine wherein an error occurred initially checks each flag related to image forming inability status such as jamming (step S101→S201→S301). When it judges that aforesaid copying machine is in an outputting impossible status, it calculates recovery information (step S102), i.e., number of sets wherein images are not formed and number of pages wherein images are not formed (hereinafter, this may be referred to as "remaining portion") in a set wherein image forming has been finished partially.

Next, the CPU in the copying machine wherein an error occurred judges whether copying operation is being operated by the master copying machine or by the slave copying machine (step S103).

If the copying machine wherein an error occurred is a slave copying machine, it is necessary to send error occurrence information to the master copying machine. For this purpose, an error sending code which is information for sending error occurrence, name or number of the copying machine, un-formed image sets (remaining sets) and the number of remaining copying sheets wherein images have not been finished in a set which has not finished copying completely that are recovery information (step S202), and then, sets a sending flag which commands sending start. In such occasions, instruction of recovery copying depends upon the master copying machine.

Recovery information (hereinafter, referred to as "recovery copying information") is represented by a series of alpha-numeric symbols, for example, "EC09, 03, 05, 20", wherein "EC09, 03" represents a sending code indicating that the error occurred in a copying machine in which copying was allotted, the machine number is 3, the number of sets wherein images have not yet been formed is 5 and number of pages in which images have not yet been formed in a set in which image forming has been completed partially is 20.

In order to grasp copying advancing conditions of other inter-connected copying machines, the master copying machine requests the other copying machines in which an error has not occurred to send information about unfinished copying which is information representing the quantity until the allotted copying is finished (not illustrated).

As a parameter for representing the quantity of unfinished (not copied) paper as information about unfinished copying, number of sheets in which copying is not finished is used in the present invention. However, the present invention is not limited thereto. The time until copying finishing may also be used, and both data may be sent as information about unfinished copying. For example, the time until copying is finished is number of unfinished sheets divided by the copying speed of each copying machine. Aforesaid time is calculated in each copying machine, and then sent to the master copying machine.

In accordance with the above-mentioned data-sending request, CPU 27 of the master copying machine receives the information about unfinished copying which was sent from other copying machines (step S105), and then, stores it in data area in RAM 27C or the flag data area.

Following the above procedure, the master copying machine selects a copying machine suitable for recovery copying (step S106) in accordance with recovery information about the number of sheets to be outputted which have not been finished image forming yet, information about unfinished copying regarding the number of unprocessed copying sheets and the copying speed which is status information, and then, studies operation allotment. This procedure will be explained later referring to FIG. 8 in detail. In addition, the master copying machine alerts the operator of jamming occurrence by means of visual display and buzzer. When selecting a copying machine which conduct recovery copying, the master copying machine may arbitrarily set selection of copying machine and copying quantity, considering efficiency of the physical distance with the inter-connected copying machines (in other words, the time necessary for going there for taking and returning to the master copying machine. Otherwise, the operator may arbitrarily select connection or independence, not judging based on copying quantity.

Figure 11:
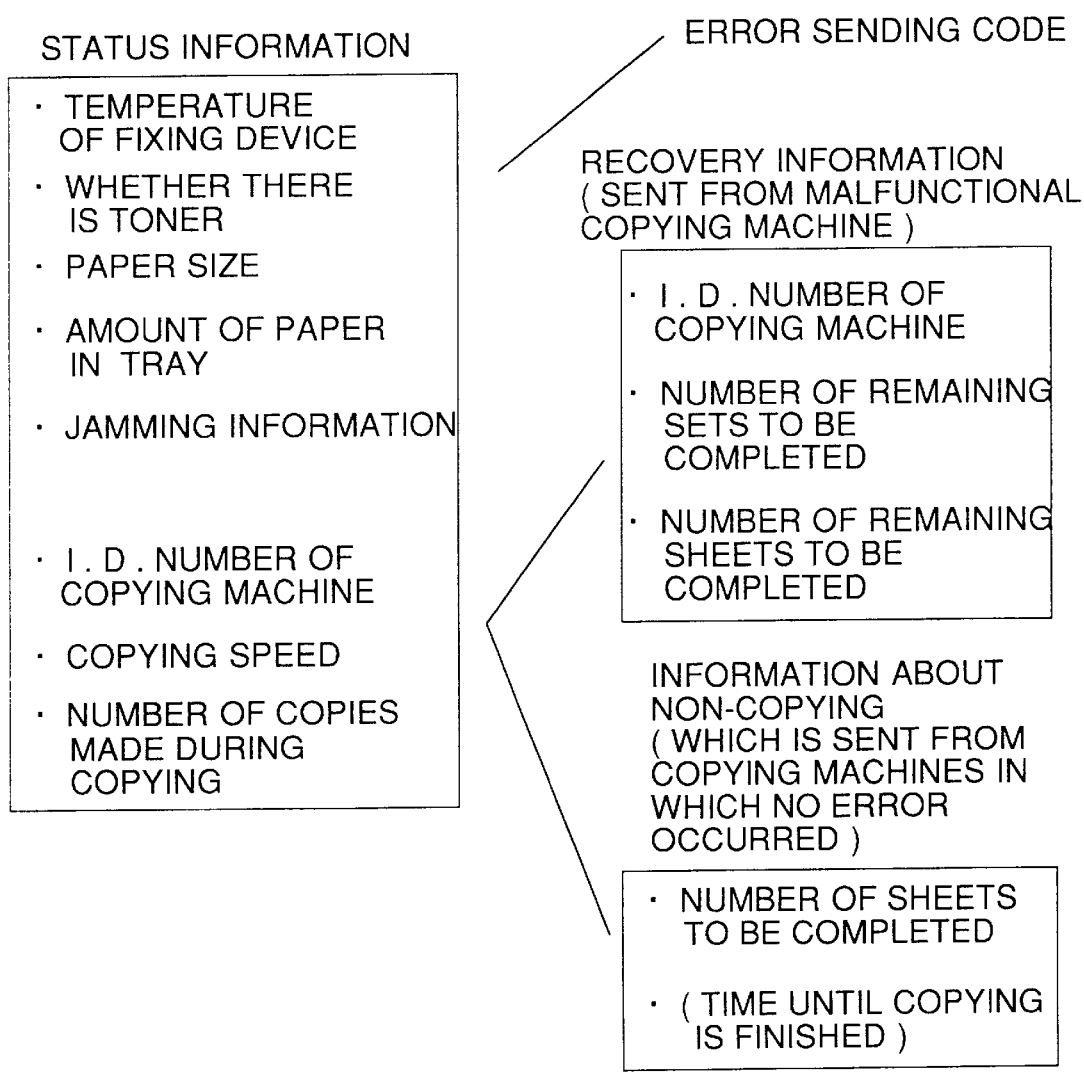
FIG. 11 is a drawing showing the contents of status information, recovery information and information about unfinished copying.

The relationship between the above-mentioned information is shown in FIG. 11.

Following the above, the master copying machine selects a copying machine suitable for recovery copying in accordance with recovery information about the number of sheets to be outputted which have not been finished image forming yet, information about unfinished copying regarding the number of unprocessed copying sheet and copying speed which is status information, and then, studies operation allotment.

If the copying machine in which error occurred is the master copying machine, it is necessary to grasp the conditions of itself for recovery copying, and concurrently with this, to grasp the advancement situation of other copying machines inter-connected thereto. The master copying machine requests the other copying machines to send information about unfinished copying which is information representing quantity until they finish the initially allotted copying (step S104).

In accordance with the above-mentioned sending request, CPU 27 of the master copying machine receives the information about unfinished copying which was sent from other copying machines (step S105), and then, stores it in data area in RAM 27C or the flag data area.

Following the above, the master copying machine selects a copying machine suitable for recovery copying (step S106) in accordance with recovery information about the number of sheets to be outputted which have not been finished image forming yet, information about unfinished copying regarding the number of unprocessed copying sheet and copying speed which is status information, and then, studies operation allotment. This procedure will be explained later referring to FIG. 8 in detail. In addition, the master copying machine alarms the operator jamming occurrence by means of display and buzzer. When selecting a copying machine which conducts recovery copying, the master copying machine may arbitrarily set selection of copying machine and copying quantity, considering efficiency of the physical distance with inter-connected copying machines (in other words, time necessary for going there for taking and returning to the master copying machine. Otherwise, the operator may arbitrarily select connection or independence, not judging based on copying quantity.

Even when the operator selects recovery copying manually, with regard to the selection of copying machine suitable for required conditions and operation allotment, calculation may automatically be conducted and its results may be displayed, and then, utilizing the results, the recovery copying may be designated manually.

When recovery copying is selected automatically, operation allotment is calculated in such a manner that copying can be finished in the shortest time.

Once copying machines which conduct recovery copying and their allotted quantity are determined, the master copying machine sends them recovery copying commands.

Recovery copying information is represented by a series of alpha-numeric symbol, for example, "EC10, 02, 02, 20", wherein "EC10, 02" represents a sending code indicating that the error occurred in a copying machine in which copying was allotted, machine number is 2, the number of sets wherein images have not been formed is 2 and the number of pages in which images have not been formed in a set in which image forming has been completed only partially is 20.

Namely, in order to send the above-mentioned recovery copying command, set the recovery copying command code which commands recovery copying, unit number of copying machines which are allotted to conduct recovery copying, the number of the remaining sets and number of the remaining sheets in a set which has not been finished copying completely to a sending buffer (step S107), and then, set a sending flag (step S108). The recovery copying command is actually sent by a sending sub-routine called from the main routine.

Figure 8:
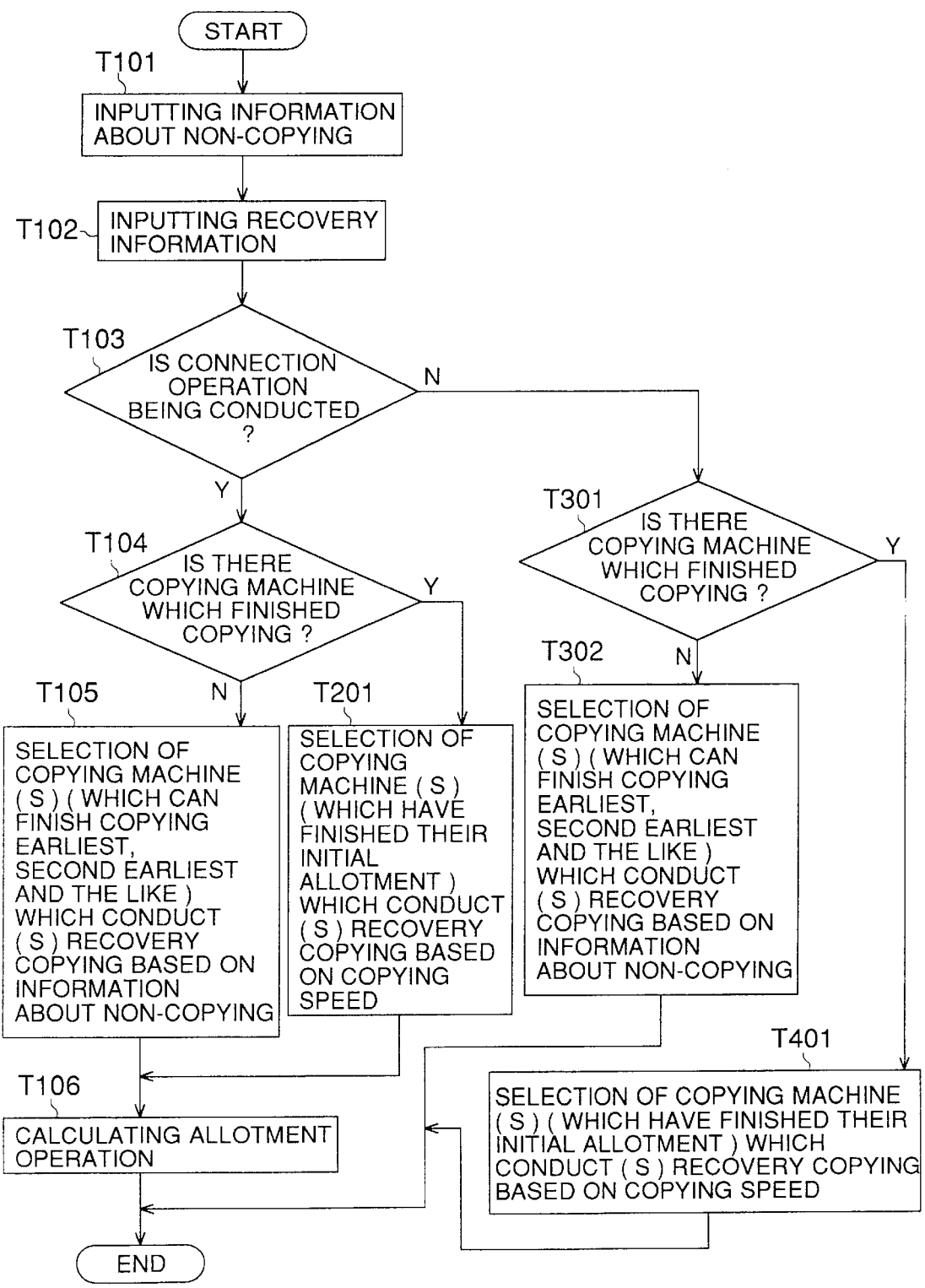
FIG. 8 is a flow diagram of a sub-routine of a process wherein a determination means determines a copying machine suitable for recovery copying and allow a determined copying machine to conduct recovery copying operation.

FIG. 8 shows a sub-routine when the master copying machine judges copying machine which conducts recovery copying and copying operation is allotted to them. It corresponds to step R119 in the flow chart in FIG. 5-B.

Suppose that information about unfinished copying, regarding unformed image portion in each slave copying machine, which is necessary for judgment, has already been inputted (step T101) and further suppose that recovery information to be subjected to recovery copying has also already been inputted (step T102).

Next, based on the number of remaining sets among recovery information, it is determined whether the recovery copying is conducted by means of inter-connection operation of plural copying machines or on an independent operation basis of aforesaid plural copying machines (step T103).

In the case of recovery copying operation by means of plural copying machines, check whether there is a copying machine which has already finished its initially allotted copying quantity, by means of the information about unfinished copying (step T104).

When there is no copying machine which has already finished its initially allotted copying quantity, select the copying machine which will finish copying earliest, the next earliest and so on, and allot the amount of recovery copying to them, based on the information about unfinished copying. In this occasion, if operation allotment is determined in such a manner that the time necessary for recovery copying will be the shortest by means of combining the information about unfinished copying and copying speed, highly effective recovery copying becomes possible.

When there are copying machines which have already finished the initially allotted copying quantity, calculate operation allotment in such a manner that number of recovery copying set is allotted to the most speedy copying machine, the next most speedy copying machine and so on from the copying speed in the status information (step T201). In this occasion, if using copying machines which have not finished copying their initial allotment results in earlier completion of recovery copying, this procedure may be taken.

Next, when inter-connection operation is not taken, determine whether there are copying machines which have already finished their initially allotted copying quantity. If there are copying machines which have already finished the initially allotted copying quantity, select the most speedy copying machine from the copying machines which have already finished the initially allotted copying quantity (step T401). If there is no copying machine which has already finished its initially allotted copying quantity, select the copying machine which will finish its copying earliest (step T302).

Due to the above-mentioned procedures, highly effective recovery copying becomes possible in accordance with status information such as the information about unfinished copying and copying speed.

Figure 9:
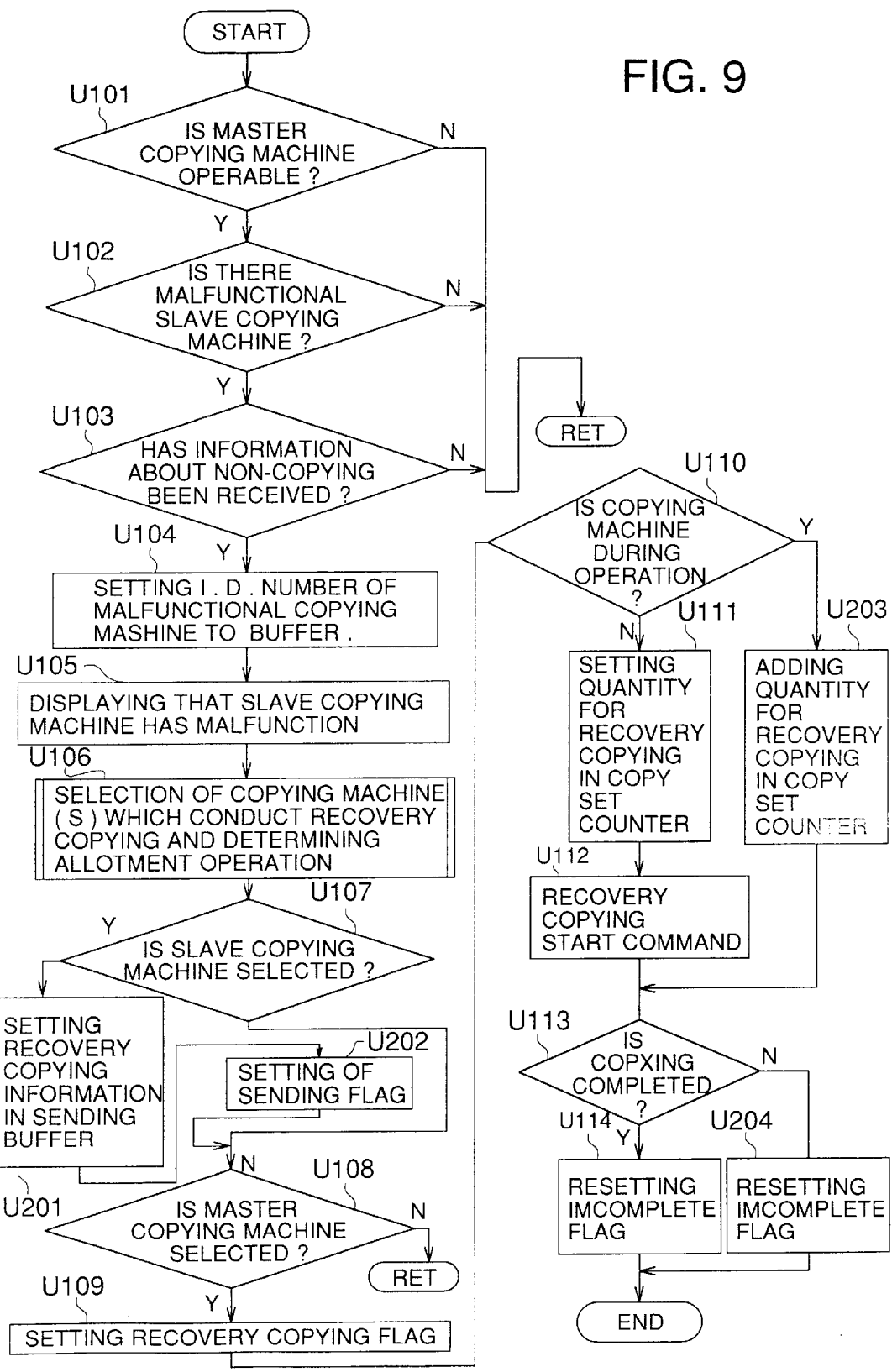
FIG. 9 is a flow diagram of a sub-routine of a process which conducts recovery copying based on received information about unfinished copying.

FIG. 9 is a sub-routine which conducts recovery copying, when there occurred an error such as jamming in a slave copying machines, after the master copying machine receives recovery information including error information. This sub-routine relates to step R119 to R120 in FIG. 5-A and is called from the main routine.

First, as a pre-condition for conducting the present sub-routine, check whether the error occurred in the master copying machine (master copying operation) (step U101), also check whether the error occurred in a slave copying machine (step U102) and also check whether such information about unfinished copying has been received when the error occurred (step U103). If all answers are yes, the processing of the present sub-routine is conducted.

Next, based on the recovery information sent from copying machine 3, set the unit number of the erroneous copying machine into the buffer (step U104), and then, inform to the other copying machines that an error occurred (step U105).

Following this, based on FIG. 8, determine copying machines which conduct recovery copying and the operation allotment (step U106). From the results thereof, check whether slave copying machines are used for recovery copying (step U107). If the slave copying machines are already in use, prepare for sending recovery information to aforesaid slave copying machines (steps U201 and U202). Next, check whether the master copying machine is being used for recovery copying. If it is not used, this routine is finished. If it is being used, set a recovery copying flag for showing that the master copying machine has entered into the recovery copying operation (step U109).

Here, judge whether the master copying machine is in use (step U110). When it is in operation, add the number of sets for recovery copying to the copying set counter (step U203) so that the master copying machine continuously copies its initial allotment and the recovery copying.

When the initial allotment has already been finished (step U109), set number of sets for recovery copying into the copying set counter (step U110), and then, send a recovery copying starting command (step U111).

Next, determine whether there are image-unformed portions whose quantity is less than one full set of material, i.e., remaining copying (step U113). If there is, set the remaining flag (step U114), and if there is not, reset (step U204) and finish the sub-routine.

The above-mentioned procedure facilitates to complete one set of copies by combining copies before jamming occurrence and copies of recovery copying, due to the above-mentioned recovery copying at the end of the recovery copying or to discharge copies by means of the above-mentioned recovery copying to a specific dischargeing unit. This will now be explained in FIG. 10.

Figure 10:
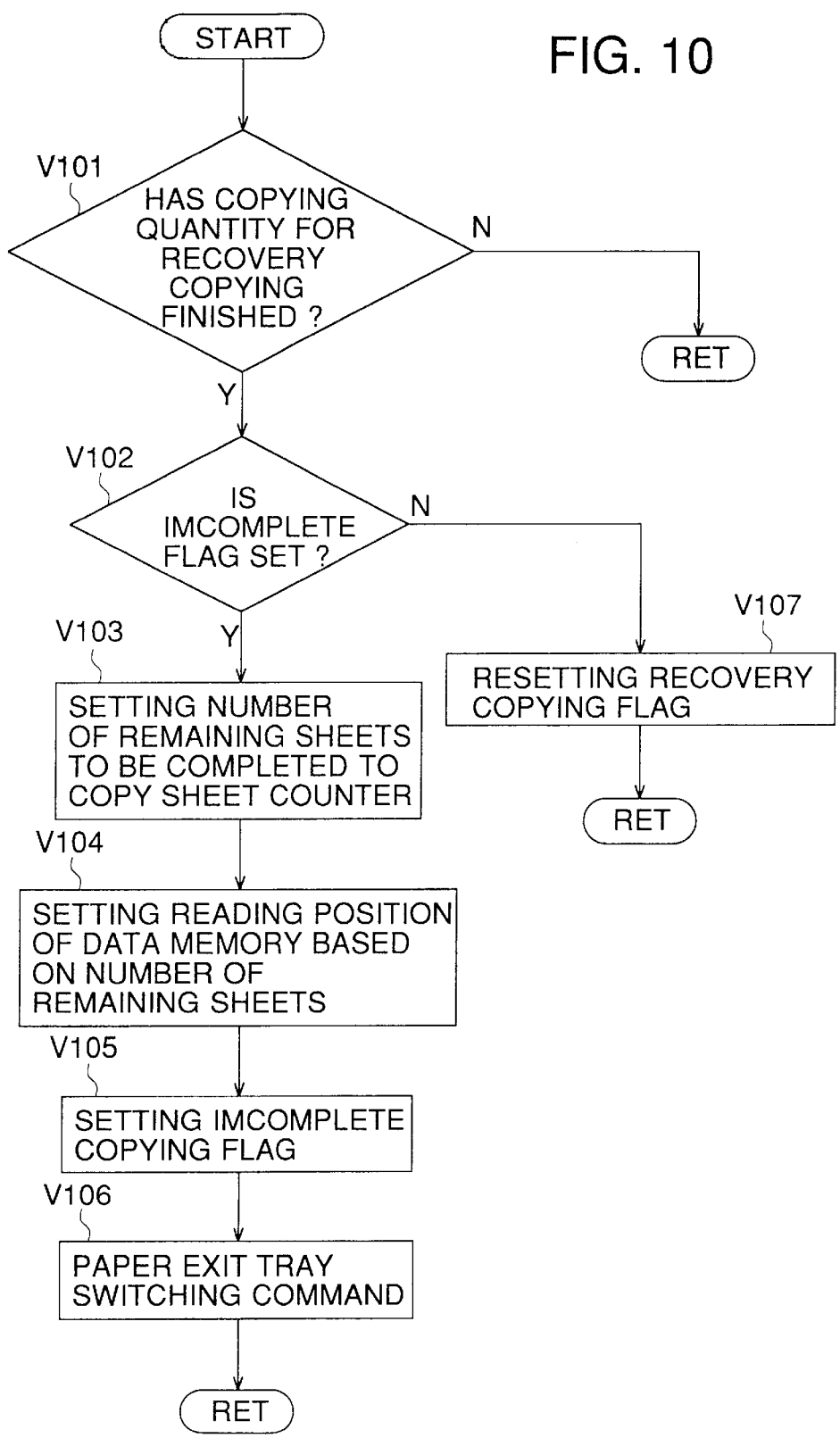
FIG. 10 is a flow diagram of a sub-routine of a process which conducts recovery copying, based on received information about unfinished copying, about portion which did not finish forming images before a set of copying is not completed, i.e. remaining portion.

FIG. 10 shows a sub-routine for recovery copying about remaining portion. The present sub-routine relates to step R126 in FIG. 5-B, and is called from the main routine.

Firstly, check whether copying of recovery copying sets has been finished (step V101). If it is finished, refer to the remaining portion flag to know whether there are remaining copying (step V102). If there is not, reset the recovery copying flag assuming that recovery copying has been finished (step V107).

If there are remaining portions, set the number of remaining sheets into the copying sheet counter (step V103), and then, calculate, using aforesaid remaining number of sheets, reading address of the image data from the memory for the image data and designate the reading position of the image data for the first page of the remaining copying (step V104). Next, set a status flag during copying operation for the remaining portion (step V105). Next, in order to facilitate taking up copies for the remaining portion, an discharge tray switching command switches discharge trays to which the copies for the remaining portion is discharged.

Here, copying for the remaining portion is finally made, and, in addition, the dischargeing tray is switched. However, the same effect can be obtained by controlling in such a manner that copying of the remaining portion at first, when copying the remaining portion, and dischargeing them to a specific dischargeing unit in place of copying the remaining portion finally in the case that the dischargeing tray is switched, returning the dischargeing tray to the initial one, due to the discharge tray switching command, when copying for the remaining portion has been finished and successively conducting recovery copying for the remaining sets. In addition, if the dischargeing unit inclus a shift tray function, similar effects can be obtained by sliding discharge position for the remaining portion and dischargeing papers there.

Returnning to FIG. 4, the above-mentioned procedures will be explained more practically.

Marks (a) through (i) in the following explanation will correspond with marks for operations shown in FIG. 4.

Suppose that 50 sheets of originals are loaded onto copying machine 1, and that the number of sets is 20 which is copied by means of the inter-connection mode. In addition, suppose that copying machine 1 sends the status information sending request to the other copying machines and that it allots number of copying sets depending upon their copying capacity, in accordance with the status information received by copying machine 1. Allotment is determined by the relationship between copying speed ratio of each copying machine and the number of sets to be copied. Now, relation between the copying speed (CPM: copies per minute) of copying machines 1, 2 and 3 and the number of sets allotted to each machine could be as follows (a):

| Copying machine | Copying speed (CPM) | Number of sets allotted |
|---|---|---|
| No. 1 | 60 | 8 |
| No. 2 | 40 | 5 |
| No. 3 | 50 | 7 |

In the above-mentioned manner, the master copying machine instructs each slave copying machine to copy an allotted quantity, and then, sends image data (b), and then, both the master copying machine and 2 slave copying machines start copying in the inter-connection mode (c).

Here, suppose that jamming occurred in slave copying machine 3 on the 31st sheet of the 2nd set (d). Due to this, the remaining 5 sets and 20 sheets of unformed copies in the 2nd set must be subjected to recovery copying by the other copying machines. As explained above, copying machine 3 sends the master copying machine recovery information which means error occurrence (e). The master copying machine requests the operable inter-connected copying machine information about unfinished copying (f). The master copying machine receives the information about unfinished copying as an answer to the above-mentioned request (g). In accordance with this and status information such as copying speed, the master copying machine selects the recovery copying machines and their allotment (h). In this case, allotment will be as follow.

| Copying machine | Information about unfinished copying | Allotment |
| --- | --- | --- |
| No. 1 | 290 sheets or 4.3 min | 3 sets |
| No. 2 | 190 sheets or 4.8 min | 2 sets + 20 sheets |
| No. 3 | — | — |

However, if copying machine 2 is interrupted copying due to depleted papers in the tray during allotted copying and replenishment of papers must be conducted, or if the following information about unfinished copying, due to when copying time was different, came to the master copying machine, allotments are amended in accordingly.

| Copying machine | Information about unfinished copying | Allotment |
| --- | --- | --- |
| No. 1 | 290 sheets or 4.8 min | 4 sets |
| No. 2 | 240 sheets or 6 min | 1 set + 20 sheets |
| No. 3 | — | — |

FIG. 4 shows the former example, wherein the master copying machine is allotted 3 sets for recovery copying and the slave copying machine 2 conducts recovery copying for 2 units and the image unformed portion of the remaining unfinished set (the remaining portion) of 20 sheets (i). Incidentally, the image unformed portion of the remaining unfinished set (the remaining portion) of 20 sheets is copied finally so that it easily is combined with 30 sheets of copies in a set which was copied by slave copying machine 3 before the occurrence of jamming. Thus, one completed set of copies is formed. In addition, a varied example discharges 20 pages for the remaining portion to another exit (the lowest step in the multiple bin sorter 2G) unit as shown in FIG. 6 instead of copying the remaining portion finally so that combination with copies in the unfinished set copied by copying machine 3 before the occurrence of jamming.

With regard to the selection of allotting recovery copying based on information about unfinished copying, when recovery copying quantity is only one set, highly effective recovery copying can be conducted if selecting a copying machine which has already finished its initial allotment, judging from the information about unfinished copying from connected copying machines. If there is no copying machine which has already finished its initial allotment, highly effective recovery copying can be conducted if selecting a copying machine which will finish its initial allotment earliest.

Due to the above-mentioned constitution, the present invention provides the following benefits.

Whichever a copying machine in the present copying system becomes impossible to form images, it is possible to conduct recovery copying by sending image data to the remaining copying machine.

When one copying machine of the copying system in the present invention becomes inoperable, the present copying system can enter into immediate recovery copying based on status information.

Rapid control with high fidelity is possible.

Since pages wherein images have not yet been formed, in a set which has finished image forming partially are copied lastly, they are combined with the pages wherein images have already been formed in aforesaid set so that one complete set can be prepared and taken up.

Since pages wherein images have not been formed in a set which finished image forming partially are discharged to a specific discharge unit, they can be combined with the pages wherein images have been formed in aforesaid set without confusion so that one complete set can be prepared and taken up.

Each copying machine in the present copying system can be accurately evaluated whether it is suitable for copying.

Another effect is that outputted images, wherein images have not been formed, allotted to a copying machine which became impossible to form images can be started forming the images without stopping copying operation so that waste of time due to waiting cannot occur.

What is claimed is:

1. A copying system comprising:
   a plurality of copying apparatus each capable of sharing image formation with other copying apparatus, said plurality of copying apparatus each comprising:
   (a) reading means for reading an original document to obtain an image data thereof;
   (b) memory means for storing the image data;
   (c) image forming means for forming an image, based on the image data stored in said memory means;
   (d) selecting means for selecting an inter-connected mode for communicating with other copying machine and to conduct image forming;
   (e) control means for determining allotment conditions for the image formation with other copying apparatus when an inter-connected mode in which said plurality of copying apparatus are connected and operated with each other is selected;
   (f) sending means for sending the image data stored in said memory means to other copying apparatus;
   (g) receiving means for receiving an image data sent from other copying apparatus, the image data received being stored in said memory means;
   wherein when the inter-connected mode is selected, each of said other copying apparatus forms images on the basis of the image data received according to the determined allotment conditions,
   and wherein when one of the plurality of copying apparatus in the inter-connected mode during image forming operation becomes unable to form images, said control means determines new allotment conditions for the image formation with the other operable copying apparatus to form images which have not been formed among images allotted to said one of the copying apparatus.

2. The copying system of claim 1 further comprising:
   state information sending means for sending a state information representing a state of one of the copying apparatus to other copying apparatus;
   state information receiving means for receiving a state information of said other copying apparatus;
   wherein said control means determines the allotment conditions on the basis of the received state information of said other copying apparatus when the inter-connected mode is selected.

3. The copying system of claim 1, wherein the state information includes a copying speed of each of the copying apparatus.

4. The copying system of claim 1 further comprising:

recovery information sending means for sending other copying apparatus a recovery information representing an information relating to images which has not been finished to form when a copying apparatus becomes unable to form images in the inter-connected mode; and recovery information receiving means for receiving a recovery information of said other copying apparatus, wherein said control means determines new allotment conditions with said other copying apparatus on the basis of the recovery information received, when said other copying apparatus become unable to form images during image forming operation in the inter-connected mode.

5. The copying system of claim 4, wherein said recovery information includes at least either a number of copying sets or a number of copying sheets to be completed which have not been finished.

6. The copying system of claim 1, wherein when one of said plurality of copying apparatus becomes unable to form images, said control means determines the allotment conditions so that pages belonging to a complete copying set which have not been finished, are copied after allotted copying operation is completed.

7. The copying system of claim 1, wherein at least one of said plurality of copying apparatus has a plurality of exit portions for storing copied sheets on which an image has been formed, and when one of said plurality of copying apparatus becomes unable to form images, said control means controls said at least one of said plurality of copying apparatus so that images which have not been finished among images allotted to said one of the copying apparatus, are copied and discharged onto a specific part of said plurality of exit portions.

8. The copying system of claim 2, wherein the state information includes an unfinished copying information with respect to a remaining amount copies to be completed.

9. The copying system of claim 8, wherein the unfinished copying information includes at least either a period of time for completion of a copying operation or an information for a number of sheets which have not been finished to copy.

10. The copying system of claim 8, wherein said control means determines the allotment conditions for each of said plurality of copying apparatus, based on the unfinished copying information.

11. The copying system of claim 8, wherein said control means determines new share conditions on the basis of the unfinished copying information by taking priority of a copying apparatus in which allotted copying has been completed.

12. The copying system of claim 8, wherein said control means determines new allotment conditions on the basis of the unfinished copying information by taking priority of a copying apparatus in which allotted copying is completed earlier.

13. The copying system of claim 12, wherein said control means sends an image data to the copying apparatus to which allotted copying is given again and the priority has been taken.

* * * * *